(12) United States Patent
Duan et al.

(10) Patent No.: US 9,633,612 B2
(45) Date of Patent: Apr. 25, 2017

(54) DISPLAY CONTROL SYSTEM AND METHOD, AND DISPLAY DEVICE

(71) Applicants: BOE TECHNOLOGY GROUP CO., LTD., Beijing (CN); BEIJING BOE MULTIMEDIA TECHNOLOGY CO., LTD., Chaoyang District, Beijing (CN)

(72) Inventors: Xin Duan, Beijing (CN); Xuezheng Li, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/408,290

(22) PCT Filed: Jun. 10, 2014

(86) PCT No.: PCT/CN2014/079605
§ 371 (c)(1),
(2) Date: Dec. 15, 2014

(87) PCT Pub. No.: WO2015/062279
PCT Pub. Date: May 7, 2015

(65) Prior Publication Data
US 2016/0275882 A1 Sep. 22, 2016

(30) Foreign Application Priority Data
Oct. 30, 2013 (CN) .......................... 2013 1 0528715

(51) Int. Cl.
*G09G 3/36* (2006.01)
*G09G 3/34* (2006.01)

(52) U.S. Cl.
CPC ............. *G09G 3/36* (2013.01); *G09G 3/3406* (2013.01); *G09G 3/3611* (2013.01); *G09G 2310/08* (2013.01); *G09G 2330/021* (2013.01)

(58) Field of Classification Search
CPC ............... G09G 3/3208; G09G 3/3258; G09G 2310/08; G09G 3/36; G06F 3/0488
See application file for complete search history.

(56) References Cited

U.S. PATENT DOCUMENTS

2001/0020928 A1* 9/2001 Yanagisawa ......... G09G 3/3648
345/98
2003/0030633 A1 2/2003 Chou et al.
(Continued)

FOREIGN PATENT DOCUMENTS

CN 1764303 A 4/2006
CN 101268503 A 9/2008
(Continued)

OTHER PUBLICATIONS

International Search Report with English Language Translation, dated Sep. 22, 2014, Application No. PCT/CN2014/079605.
(Continued)

*Primary Examiner* — Gerald Johnson
(74) *Attorney, Agent, or Firm* — Blakely Sokoloff Taylor & Zafman LLP (57) ABSTRACT

The present disclosure relates to the field of display technology, and particularly to a display control system and control method, and a display device. The display control system comprises a plurality of source drive chips, a plurality of gate drive chips, a power-on timing controller and a standby timing controller, each of the source drive chips being connected with the power-on timing controller and the standby timing controller, respectively, the power-on timing controller being connected in series with the plurality of gate drive chips, the standby timing controller being also con-
(Continued)

nected in series with the plurality of gate drive chip. The display control system further comprises a backlight source drive chip, both the power-on timing controller and the standby timing controller being connected with the backlight source drive chip. A display of a background-pushed message by a display device in a standby state can be achieved in the present disclosure by employing a design of two timing controllers, the power-on timing controller and the standby timing controller. This solves the problem that existing display devices only enable a prompt of a background-pushed message in the standby state but fail to display the contents of the background-pushed message.

20 Claims, 3 Drawing Sheets

(56) References Cited

U.S. PATENT DOCUMENTS

| | | | |
|---|---|---|---|
| 2006/0084416 A1 | 4/2006 | Wakasa et al. | |
| 2007/0242007 A1* | 10/2007 | Lee | G09G 3/3208 345/82 |
| 2013/0187692 A1 | 7/2013 | Chen et al. | |
| 2013/0293600 A1* | 11/2013 | Lee | G09G 3/3258 345/691 |
| 2014/0120988 A1* | 5/2014 | Gunn | G06F 3/0488 455/566 |

FOREIGN PATENT DOCUMENTS

| | | |
|---|---|---|
| CN | 101494681 A | 7/2009 |
| CN | 101729679 A | 6/2010 |
| CN | 103366700 A | 10/2013 |
| CN | 103531170 A | 1/2014 |
| CN | 1517966 A | 8/2014 |
| JP | 2012-198287 A | 10/2012 |

OTHER PUBLICATIONS

English Translation of Chinese First Office Action, dated Mar. 3, 2015, Chinese Application No. 201310528715X.

Chinese Second Office Action with English Translation, dated Aug. 21, 2015, Chinese Application No. 201310528715X.

Chinese Office Action with English Language Translation, dated Feb. 22, 2016, Chinese Application No. 201310528715.X.

* cited by examiner

DISPLAY CONTROL SYSTEM AND METHOD, AND DISPLAY DEVICE

FIELD OF THE DISCLOSURE

The present disclosure relates to the field of display technology, and particularly to a display control system and method, and a display device.

BACKGROUND OF THE DISCLOSURE

In normal operation of a conventional liquid crystal display device, the backlight source is provided by a backlight unit that comprises light-emitting strips (LED strips); in a standby state where the liquid crystal display device does not refresh pictures any more, the backlight unit is switched off. That is, in case of the standby, the liquid crystal display device as a whole is in a off state where a restart is needed if contents are to be displayed.

A state-of-the-art smart application server generally supports a function of pushing messages in the background, i.e. at the time of reception of a message such as breaking news or a change of weather, corresponding software would prompt the user of important information. On current products such as cell phones or television sets, a prompt of such background-pushed messages is implemented by an outside LED indicator lamp. The conventional technology described above enables solely the prompt of the background-pushed messages, but fails to display the main contents. If a complete display of the contents of message is desired, a full activation of the liquid crystal display device is needed to acquire the message, leading to inconvenience operations in the process of turning on/off and unnecessary loss of electrical energy.

Therefore, to address the aforementioned problems, the present disclosure proposes a novel system and method for display controlling and a display device.

SUMMARY OF THE DISCLOSURE

It is an objective of the present disclosure to provide a display control system and method, and a display device to solve the problem that existing display devices only enable a prompt of a background-pushed message in the standby state and fail to display the contents of the background-pushed message.

In accordance with a respect of the present disclosure, a display control system is provided. The display control system comprises a plurality of source drive chips, a power-on timing controller, connected with the plurality of source drive chips, for providing the plurality of source drive chips with a first source drive signal, a standby timing controller, connected with the plurality of source drive chips, for providing the plurality of source drive chips with a second source drive signal, and a plurality of gate drive chips, wherein the power-on timing controller is connected in series to the plurality of gate drive chips to provide the plurality of gate drive chips with a first gate timing signal, and the standby timing controller is connected in series to the plurality of gate drive chips to provide at least one of the plurality of gate drive chips with a second gate timing signal.

In accordance with a respect of the present disclosure, a display of a background-pushed message by a display device in a standby state can be achieved by employing a power-on timing controller and a standby timing controller. This solves the problem that existing display devices only enable a prompt of a background-pushed message in the standby state but fail to display the contents of the background-pushed message. The contents of the background-pushed message can be displayed by the display device without a need for an activation, thus simplifying the process for the user to acquire the contents of the message and reducing the loss of the electric energy caused by frequent activations for acquiring the message contents.

In accordance with an embodiment of the present disclosure, a backlight source drive chip is further comprised; the power-on timing controller and the standby timing controller are both connected with the backlight source drive chip.

Further, a state control module is further comprised; the state control module is connected to each of the gate drive chips, respectively.

Further, a master controller is comprised, the master controller being connected to the power-on timing controller and the standby timing controller, respectively.

In accordance with another respect of the present disclosure, provided is a display device, comprising the display control system as described. The display device further comprises a backlight unit, an array substrate, a color filter substrate, and a liquid crystal layer sealed between the array substrate and the color filter substrate, the array substrate being equipped inside with a plurality of transistors, the gate drive chips being connected with the gate of each of the transistors, and the source drive chips being connected with the source of each of the transistors.

In accordance with yet a respect of the present disclosure, a method of displaying a push message on a display device is provided. The method comprises the following steps: receiving a push message; determining the state of the display device; and displaying the push message according to the determined state of the display device, wherein, in a standby state, a standby state source drive signal and a standby state gate timing signal are generated by a standby timing controller, and in a power-on state, a power-on state source drive signal and a standby state gate timing signal are generated by a power-on timing controller.

Thereby, the background-pushed message is displayed in the power-on state by the transistors driving the display device.

In the standby state, the standby timing controller compiles in accordance with the background-pushed message and transmits, respectively, to the source drive chips and the gate drive chips, the standby state source drive signal and the standby state gate timing signal.

The source drive chips control the driving of the sources of the transistors in accordance with the standby state source drive signal; the gate drive chips control the timing of the gate of each of the transistors in accordance with the standby state gate timing signal.

Thereby, the background-pushed message is displayed in the standby state by the transistors driving the display device.

Further, the state control module detects an operating state of the display device, compiles in accordance with the operating state and transmits to the gate drive chips, a power-on switch instruction or a standby state switch instruction; the gate drive chips select between the power-on state gate timing signal and the standby state gate timing signal in accordance with the power-on state switch instruction or the standby state switch instruction, and act accordingly.

Further, if the state control module detects the operating state of the display device as a power-on state, it compiles and transmits to the gate drive chips, the power-on state switch instruction, and the gate drive chips then select and act on the power-on state gate timing signal to control the timing of the gate of each of the transistors; if the state control module detects the operating state of the display device as a standby state, it compiles and transmits to the gate drive chips, the standby state switch instruction, and the gate drive chips then select and act on the standby state gate timing signal to control the timing of the gate of each of the transistors.

In accordance with an embodiment of the present disclosure, in the standby state, the standby timing controller drives intermittently the display device to display the background-pushed message within a predetermined period of time for information display, until the end of the predetermined period of time for information display or a close of the display of the background-pushed message by a user.

The standby timing controller do not have to process continuously high frequency signals by driving intermittently the display device to display the background-pushed message within the predetermined period of time for information display, thereby saving the power consumption further and prolonging the lifespan.

Further, in the standby state, the standby timing controller transmits the standby state gate timing signal to one of the gate drive chips; this gate drive chip controls the timing of the gates of some of the transistors with which it is connected in accordance with the standby state gate timing signal, thereby displaying the background-pushed message in the standby state by the some of the transistors driving a portion of display region of the display device.

Further, in the power-on state, the backlight source drive chip receives the power-on state backlight drive signal transmitted by the power-on timing controller and drives the light-emitting strips to emit light in accordance with the power-on state backlight drive signal; in the backlight source drive chip receives the standby state backlight drive signal transmitted by the standby timing controller and drives the light-emitting strips to emit light in accordance with the standby state backlight drive signal.

The present disclosure may realize an according driving of the light-emitting strips located at the left or right side of the display region in dependence of a specific location for display of the background-pushed message, respectively, by employing the step that the standby timing controller in the standby state determines a display location of the background-pushed message on the display region of the display device from an analysis of the background-pushed message, and drives the light-emitting strips on one or both sides corresponding to the display location accordingly. For example, the standby timing controller drives the light-emitting strips that are located at the left side of the display region to emit light if the background-pushed message is located at the left side of the display region, while the light-emitting strips located at the right side do not emit light, thereby further lowering the power consumed by the display control system effectively in the overall control process.

BRIEF DESCRIPTION OF DRAWINGS

The present disclosure is further illustrated in the following from the embodiments in conjunction with the accompanying drawings.

DETAILED DESCRIPTION OF PREFERRED EMBODIMENTS

Figure 1:
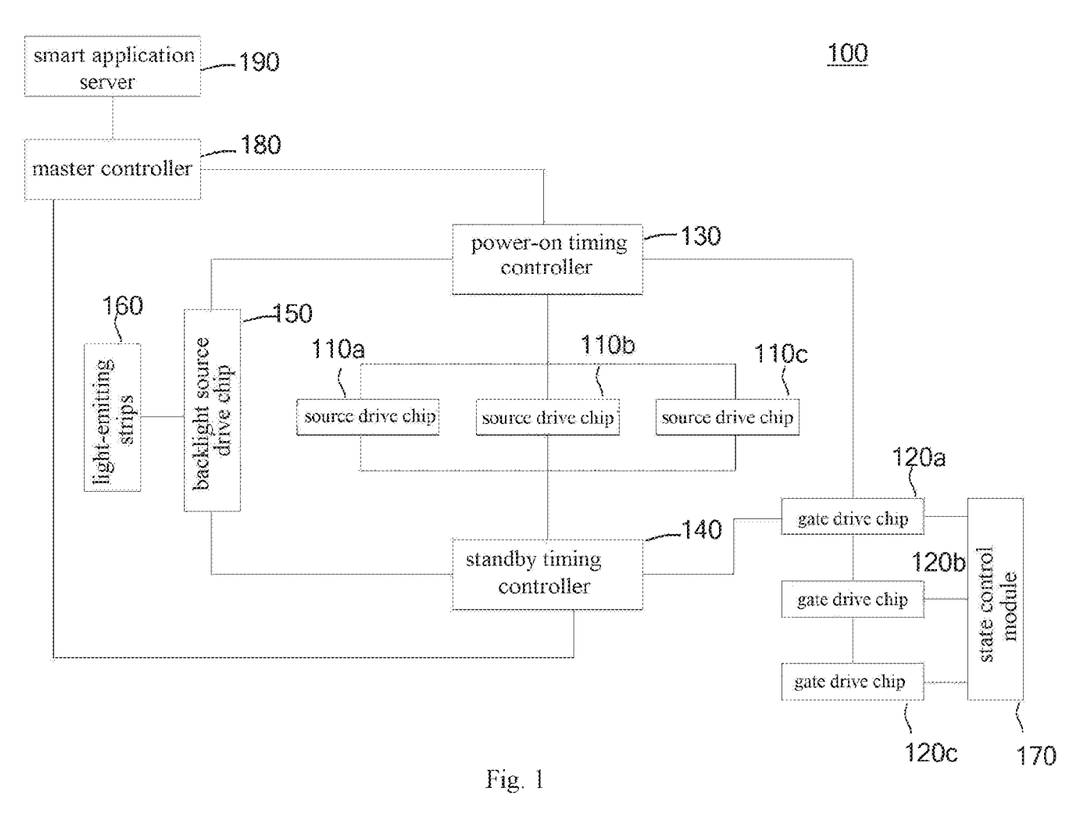
FIG. 1 is a block diagram of a display control system according to an embodiment of the present disclosure.

Referring to FIG. 1, according to an embodiment of the present disclosure, provided is a display control system 100 comprising a plurality of source drive chips 110a, 110b, 110c, a plurality of gate drive chips 120a, 120b, 120c, a power-on timing controller 130 and a standby timing controller 140, wherein each of the source drive chips 110a, 110b, 110c are connected with the power-on timing controller 130 and the standby timing controller 140, respectively, the source drive chips 110a, 110b, 110c are connected to each other in parallel, the power-on timing controller 130 is connected in series with each of the plurality of gate drive chips 120a, 120b, 120c, the gate drive chips 120a, 120b, 120c are connected to each other in a cascaded way, and the standby timing controller 140 is also connected in series with the plurality of gate drive chips 120a, 120b, 120c.

In accordance with an embodiment of the present disclosure, the power-on timing controller 130 compiles in accordance with a power-on state instruction and transmits, respectively, to each of the source drive chips 110a, 110b, 110c and each of the gate drive chips 120a, 120b, 120c, the power-on state source drive signal and the power-on state gate timing signal.

The standby timing controller 140 receives a state instruction from a master controller 180, and compiles in accordance with the standby state instruction and transmits, respectively, to each of the source drive chips 110a, 110b, 110c and each of the gate drive chips 120a, 120b, 120c, the standby state source drive signal and standby state gate timing signal.

The source drive chips 110a, 110b, 110c are connected with each of the transistors in the array substrate, and controls the driving of the source of each of the transistors in accordance with the power-on state source drive signal or standby state source drive signal.

The gate drive chips 120a, 120b, 120c are connected with each of the transistors in the array substrate, and control the timing of the gate of each of the transistors in accordance with the power-on state gate timing signal or the standby state gate timing signal. Different gate control chips 120a, 120b, 120c corresponds to different display regions. Although the standby timing controller 140 is connected in series to all the gate drive chips 120a, 120b, 120c in the embodiment of FIG. 1, it can be understood by the skilled in the art that if less contents are to be displayed in the standby information, the standby timing controller 140 can be connected to some of the gate drive chips, e.g. only connected to the gate drive chip 120c, thus displaying, in the standby state, the contents of a push message only in the display region that corresponds to this gate drive chip. When in operation, if the contents of a push message need to be displayed in regions corresponding to multiple gate drive chips, each of the gate drive chips 120a, 120b, 120c is drove in turn in sequence.

A display of a background-pushed message by a display device in a standby state can be achieved in the present disclosure by employing a design of two timing controllers, a power-on timing controller 130 and a standby timing controller 140. This solves the problem that existing display devices only enable a prompt of a background-pushed message in the standby state but fail to display the contents of the background-pushed message. The contents of the background-pushed message can be displayed by the display device without a need for an activation, thus simplifying the process for the user to acquire the contents of the message and reducing the loss of the electric energy caused by frequent activations for acquiring the message contents.

In addition, a normal display and a standby display can be distinguished by arranging two timing controllers. Since the contents of the push message displayed in the standby state is relatively simple (e.g. characters), requirements for the capability of image processing is not high, leading to a simple processing of the images in the standby timing controller 140, a less higher requirement for the refresh rate of the images and hence a reduced power consumption in operation.

In accordance with an embodiment of the present disclosure, the display control system 100 further comprises a backlight source drive chip 150. The power-on timing controller 130 and the standby timing controller 140 are both connected with the backlight source drive chip 150. The backlight source drive chip 150 is connected to at least two light-emitting strips 160, the light-emitting strips 160 being mounted in the backlight unit of the display device as the backlight source of the display device.

The backlight source drive chip 150 receives the power-on state backlight drive signal that is transmitted by the power-on timing controller 130 or the standby state backlight drive signal that is transmitted by the standby timing controller 140, and drives the light-emitting strips to emit light in accordance with the power-on state backlight drive signal or the standby state backlight drive signal.

In accordance with an embodiment of the present disclosure, the display control system 100 further comprises a state control module 170. The state control module 170 is connected to each of the gate drive chips 120a, 120b, 120c, respectively.

In this embodiment, the state control module 170 detects an operating state of the display device, compiles in accordance with the operating state and transmits to each of the gate drive chips 120a, 120b, 120c, a power-on switch instruction or a standby state switch instruction. According to another embodiment of the present disclosure, in the standby state, the contents of a push message are only to be displayed in a particular region of the display device. The state control module 170 controls each of the gate drive chips 120a, 120b, 120c to switch on/off so as to drive only some of the gate drive chips to display in the standby mode.

The gate drive chips 120a, 120b, 120c select between the power-on state gate timing signal and the standby state gate timing signal in accordance with the power-on state switch instruction or the standby state switch instruction, and act accordingly.

For example, if the state control module 170 detects the operating state of the display device as a power-on state, it compiles and transmits to the gate drive chips 120a, 120b, 120c, the power-on state switch instruction. The gate drive chips 120a, 120b, 120c then select and act on the power-on state gate timing signal to control the timing of the gate of each of the transistors. Rather, if the state control module 170 detects the operating state of the display device as a standby state, it compiles and transmits to the gate drive chips, the standby state switch instruction. The gate drive chips 120a, 120b, 120c then select and act on the standby state gate timing signal to control the timing of the gate of each of the transistors.

It can be seen from the above illustration that the state control module 170 may control a switch between the power-on timing controller and the standby timing controller by which the gate drive chips 120a, 120b, 120c are controlled. That is, when the display device is in a power-on state, the gate drive chips 120a, 120b, 120c are switched to be controlled by the power-on timing controller 130. Otherwise, they are controlled by the standby timing controller 140. The display device may enable the display of the background-pushed message in both the power-on state and the standby state by controlling the array substrate differently in these two states, respectively.

In this embodiment, the display control system further comprises a master controller 180. The master controller 180 is connected with the power-on timing controller 130 and the standby timing controller 140, respectively. The master controller 180 is further connected with a smart application server 190 via wired or wireless network, for receiving a background-pushed message transmitted in real-time from the smart application server 190, and compiles in accordance with the background-pushed message and transmits to the power-on timing controller 130 and the standby timing controller 140, respectively, the power-on state instruction and the standby state instruction.

In the present disclosure, the standby timing controller 140 outputs a standby state source drive signal for controlling the sources 110a, 110b, 110c of the transistors in the array substrate and the standby state gate timing signal for controlling the gates of the transistors in the array substrate. The drive of the display device is achieved by matching these two set of signals.

In accordance with an embodiment of the present disclosure, further provided is a display device, comprising the display control system 100 as described above and a display panel. The display panel comprises a backlight unit, an array substrate, a color filter substrate, and a liquid crystal layer sealed between the array substrate and the color filter substrate. The array substrate is equipped inside with a plurality of transistors for driving the display device to display images. The gate drive chips are arranged at the both sides of the array substrate accordingly and are connected with each of the transistors in the array substrate. The source drive chips are arranged at the bottom of the array substrate accordingly and are connected with each of the transistors in the array substrate. Each of the gate drive chips is connected to the gate of a respective transistor in the array substrate. Each of the source drive chips is connected to the source of a respective transistor in the array substrate. The backlight source drive chip is connected with the light-emitting strips in the backlight unit, and the light-emitting strips are arranged at the both sides of the backlight unit, respectively.

In accordance with an embodiment of the present disclosure, a method of displaying a push message on a display device is further provided. In the following the method of displaying a push message on a display device is presented in detail in conjunction with the display control system described in FIG. 1. The method comprises the following steps:

The master controller 180 receives a push message from the remote smart application server 190. The push message may be, for example, an instant message such as a weather forecast and breaking news, etc., or a message customized by the client, e.g. a reminder displayed on the display device.

Having received the push message, the master controller 180 determines the state of the display device and determines how the push message is displayed based on a specific display state. A specific operation method of how to display a push message in accordance with different states is exemplified in FIG. 2.

Figure 2:
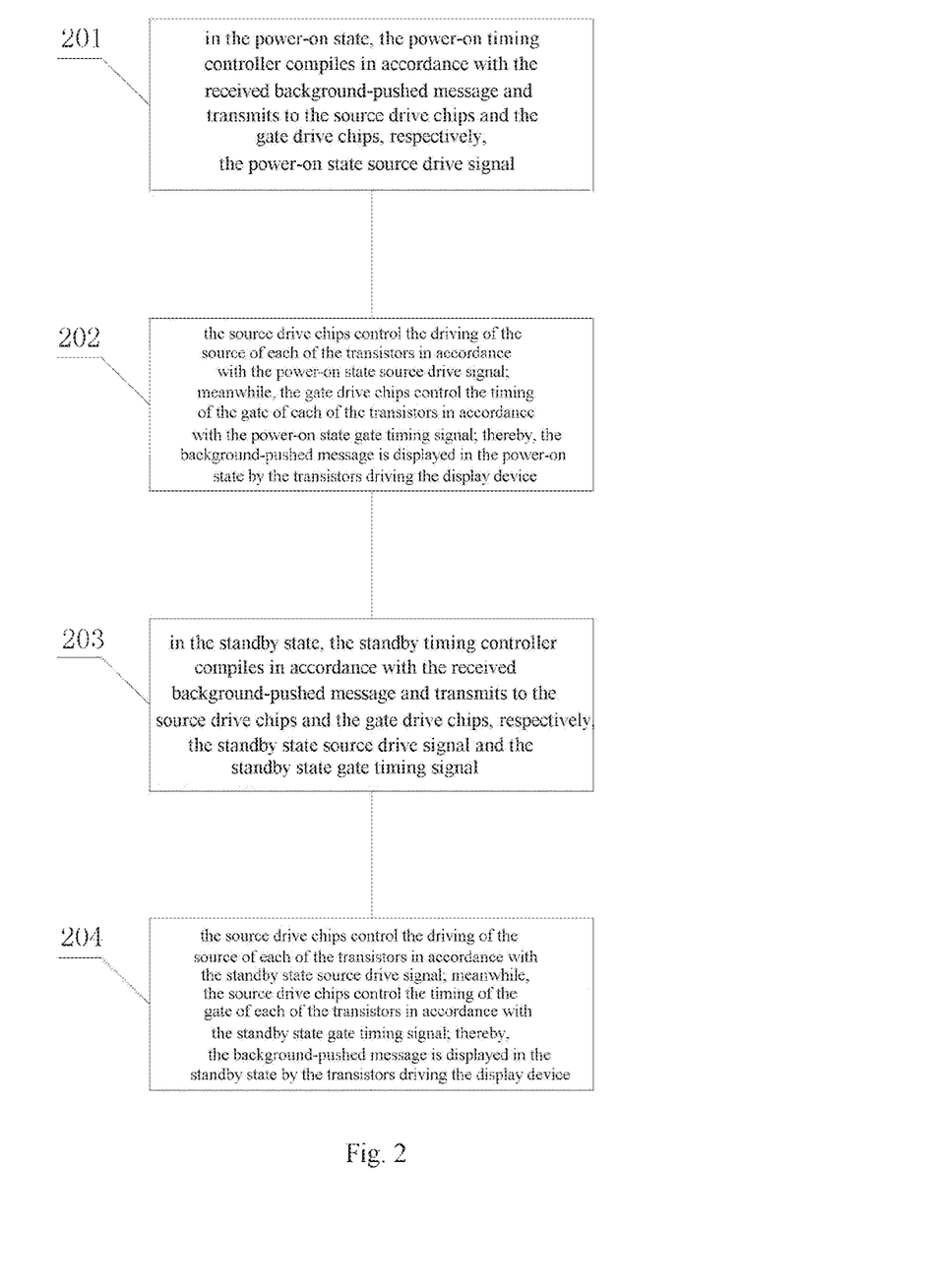
FIG. 2 is a flow chart of a control method of displaying a push message according to an embodiment of the present disclosure.

Step 201, in the power-on state, the power-on timing controller 130 compiles in accordance with the received background-pushed message and transmits to the source drive chips 110a, 110b, 110c and the gate drive chips 120a, 120b, 120c, respectively, the power-on state source drive signal.

Step 202, the source drive chips 110a, 110b, 110c control the driving of the source of each of the transistors in accordance with the power-on state source drive signal. Meanwhile, the gate drive chips 120a, 120b, 120c control the timing of the gate of each of the transistors in accordance with the power-on state gate timing signal.

Thereby, the background-pushed message is displayed in the power-on state by the transistors driving the display device.

Step 203, in the standby state, the standby timing controller 140 compiles in accordance with the received background-pushed message and transmits to the source drive chips 110a, 110b, 110c and the gate drive chips 120a, 120b, 120c, respectively, the standby state source drive signal and the standby state gate timing signal.

Step 204, the source drive chips 110a, 110b, 110c control the driving of the source of each of the transistors in accordance with the standby state source drive signal. Meanwhile, the source drive chips 120a, 120b, 120c control the timing of the gate of each of the transistors in accordance with the standby state gate timing signal.

Thereby, the background-pushed message is displayed in the standby state by the transistors driving the display device.

Figure 3:
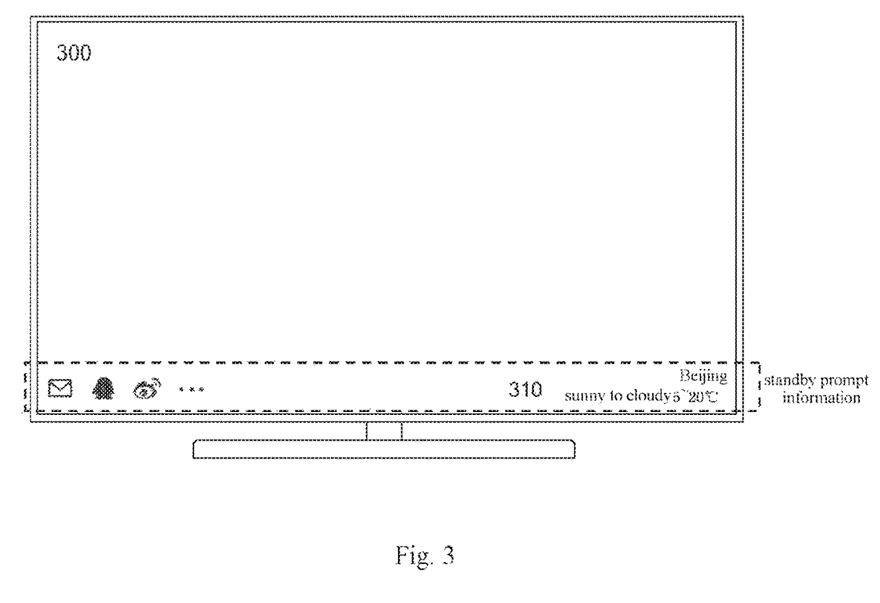
FIG. 3 is a specific interface of displaying contents of a push message in a standby state according to an embodiment of the present disclosure.

In the standby state, the standby timing controller 140 begins to drive only when it receives a background-pushed message. When no background-pushed message is received, the standby timing controller 140 does not drive and the display device is always in the standby state. A specific display interface 300 is given in FIG. 3 where a push message is displayed in a portion of the display region of the display device in the standby state. In FIG. 3, the standby push message to be displayed is a instant weather forecast that is displayed in the display region located at bottom of the display device. In addition to display the contents of the push message, the states of other applications running in the standby state may also be displayed in this display region, e.g. the states of the e-mail, QQ, Microblog and the like.

In this embodiment, the state control module 170 detects the operating state of the display device, and complies in accordance with the operating state and transmits to the respective gate drive chips 120a, 120b, 120c, the power-on state switch instruction or the standby state switch instruction. As shown in FIG. 3, in the standby state, the display device simply needs to display the contents of the push message in a portion of the display region. Thus, the state control module 170 only needs to control some of the gate drive chips that correspond to the display region accordingly. Different gate drive chips may be drove to enable display in different regions by regulating the gate timing signal that is output by the standby timing controller to define different timings. For example, the contents of the push message may be displayed using different display regions from the top of the display device to the bottom of the display device.

The gate drive chips select between the power-on state timing signal and the standby state gate timing signal in accordance with the power-on state switch instruction and the standby state switch instruction, and act accordingly.

In this embodiment, if the state control module detects the operating state of the display device as a power-on state, it compiles and transmits to the gate drive chips, the power-on state switch instruction. The gate drive chips then select and act on the power-on state gate timing signal to control the timing of the gate of each of the transistors.

If the state control module detects the operating state of the display device as a standby state, it compiles and transmits to the gate drive chips, the standby state switch instruction. The gate drive chips then select and act on the standby state gate timing signal to control the timing of the gate of each of the transistors.

According to a preferred embodiment of the present disclosure, when the display device is in the standby state, the standby timing controller 140 drives intermittently the display device to display the background-pushed message within a predetermined period of time for information display, until the end of the predetermined period of time for information display or a close of the display of the background-pushed message by a user.

Specifically, multiple points-in-time of drive-on and multiple points-in-time of drive-off are designated, with intervals between, within a certain period of time for information display. When the drive timing arrives at the point-in-time of drive-off, the standby timing controller stop driving the display device to display the background-pushed message; when the drive timing arrives at the point-in-time of drive-on, the standby timing controller begin driving the display device to display the background-pushed message. By an intermittent drive of the display device, this embodiment allows the standby timing controller not having to process high frequency signals continuously, thus saving the power consumption and prolonging the lifespan of the display device.

When the display device is in the standby state, the standby timing controller 140 transmits the standby state timing signal to one of the gate drive chips. This gate drive chip controls the timing of the gates of some of the transistors with which it is connected in accordance with the standby state gate timing signal, thereby displaying the background-pushed message in the standby state by the some of the transistors driving a portion of display region of the display device.

When the display device is in the power-on state, the backlight source drive chip receives the power-on state backlight drive signal transmitted by the power-on timing controller and drives the light-emitting strips to emit light in accordance with the power-on state backlight drive signal.

When the display device is in the backlight source drive chip receives the standby state backlight drive signal transmitted by the standby timing controller and drives the light-emitting strips to emit light in accordance with the standby state backlight drive signal.

Preferably, when the display device is in the standby state, the standby timing controller determines a display location of the background-pushed message on the display region of the display device from an analysis of the background-pushed message, and drives the light-emitting strips on one or both sides corresponding to the display location accordingly. As such, an according driving of the light-emitting strips located at the left or right side of the display region is achieved in dependence of a specific location for display of the background-pushed message, respectively. For example, the standby timing controller drives the light-emitting strips that are located at the left side of the display region to emit light if the background-pushed message is located at the left side of the display region, while the light-emitting strips located at the right side do not emit light, thereby further lowering the power consumed by the display control system effectively in the overall control process.

While the present disclosure is described in conjunction with a few embodiments, it is not intended to limit the present disclosure to the particular forms set forth herein. Rather, the scope of the present disclosure is limited only by the appended claims. In the claims, the term "comprise" do not exclude other elements or steps. Furthermore, while listed individually, multiple devices, elements or procedures can be implemented with, for example, a single unit or processor. Additionally, while individual features may be included in different claims, these features can be possibly combined to advantage.

What is claimed is:

1. A display control system, comprising:
a plurality of source drive chips;
a power-on timing controller, connected with the plurality of source drive chips, for providing the plurality of source drive chips with a first source drive signal;
a standby timing controller, connected with the plurality of source drive chips, for providing the plurality of source drive chips with a second source drive signal; and
a plurality of gate drive chips,
wherein the power-on timing controller is connected in series to the plurality of gate drive chips to provide the plurality of gate drive chips with a first gate timing signal, and the standby timing controller is connected to at least one of the plurality of gate drive chips to provide the at least one gate drive chip with a second gate timing signal.

2. The display control system of claim 1, further comprises a state control module that is connected with each of the plurality of the gate drive chips, for selecting a gate timing signal that is provided to each of the gate drive chips.

3. The display control system of claim 1, further comprises a backlight source drive chip that is connected with the power-on timing controller and the standby timing controller, respectively.

4. The display control system of claim 3, further comprises a master controller that is used to provide the power-on timing controller, the standby timing controller and the state control module with a state instruction, and to provide selectively the power-on timing controller and the standby timing controller with a push message in accordance with different states.

5. The display control system of claim 4, wherein the standby timing controller, after having received the push message from the master controller, provides the at least one of the plurality of the gate drive chips with the second gate timing signal within a predetermined period of time to display the contents of the push message in a respective display region.

6. The display control system of claim 4, wherein the standby timing controller determines a display region for displaying in accordance with the push message.

7. The display control system of claim 4, wherein the state control module switches on/off each of the plurality of gate drive chips in turn in the standby state to display the contents of the push message in a display region that corresponds to each of the gate drive chips.

8. The display control system of claim 4, wherein the standby timing controller drives a respective backlight in accordance with the determined display region.

9. A display device, comprising:
a display panel, and
a display control system, the display control system comprises:
a plurality of source drive chips;
a power-on timing controller, connected with the plurality of source drive chips, for providing the plurality of source drive chips with a first source drive signal;
a standby timing controller, connected with the plurality of source drive chips, for providing the plurality of source drive chips with a second source drive signal; and
a plurality of gate drive chips,
wherein the power-on timing controller is connected in series to the plurality of gate drive chips to provide the plurality of gate drive chips with a first gate timing signal, and the standby timing controller is connected to at least one of the plurality of gate drive chips to provide the at least one gate drive chip with a second gate timing signal.

10. The display device of claim 9, wherein the display panel is a liquid crystal display panel.

11. A method of displaying a push message on a display device, comprising the following steps:
receiving a push message;
determining the state of the display device; and
displaying the push message in accordance with the determined state of the display device,
wherein in a standby state, a standby state source drive signal and a standby state gate timing signal are generated by a standby timing controller, and in a power-on state, a power-on state source drive signal and a standby state gate timing signal are generated by a power-on timing controller.

12. The method of claim 11, wherein an operating state is detected by a state control module, and a power-on state switch instruction or a standby state switch instruction is compiled in accordance the detected operation state and transmitted to at least one of the plurality of gate drive chips to select either the power-on state gate timing signal or the standby state gate timing signal.

13. The method of claim 11, wherein in the standby state, the display device is drove by the standby timing controller intermittently to display the background-pushed message within a predetermined period of time for information display.

14. The method of claim 12, wherein in the standby state, the standby state gate timing signal is transmitted by the standby timing controller in turn to each of the plurality of gate drive chips.

15. The method of claim 12, wherein the backlight is drove by the standby timing controller in accordance with the determined display region.

16. The display device of claim 10, wherein the display control system further comprises a state control module that is connected with each of the plurality of the gate drive chips, for selecting a gate timing signal that is provided to each of the gate drive chips.

17. The display device of claim 10, wherein the display control system further comprises a backlight source drive chip that is connected with the power-on timing controller and the standby timing controller, respectively.

18. The display device of claim 17, wherein the display control system further comprises a master controller that is used to provide the power-on timing controller, the standby timing controller and the state control module with a state instruction, and to provide selectively the power-on timing controller and the standby timing controller with a push message in accordance with different states.

19. The display device of claim 18, wherein the standby timing controller, after having received the push message from the master controller, provides the at least one of the plurality of gate drive chips with the second gate timing signal within a predetermined period of time to display the contents of the push message in a respective display region.

20. The display device of claim 19, wherein the state control module switches on/off each of the plurality of gate drive chips in turn in the standby state to display the contents of the push message in a display region that corresponds to each of the gate drive chips.

* * * * *